United States Patent [19]
Spence

[11] Patent Number: 5,895,185
[45] Date of Patent: Apr. 20, 1999

[54] AUTOMATIC BOAT TO TRAILER LATCH

[76] Inventor: Wendell Lee Spence, P.O. Box 1034, East Jordan, Mich. 49727

[21] Appl. No.: 08/901,078

[22] Filed: Jul. 28, 1997

[51] Int. Cl.[6] ............................................. B60P 7/06
[52] U.S. Cl. ........................ 410/77; 410/69; 410/2; 410/80; 280/414.1
[58] Field of Search ............................ 410/69, 77, 81, 410/80, 2, 3, 7; 280/414.1, 508; 292/341.15, 341.17; 114/344; 414/536

[56] References Cited

U.S. PATENT DOCUMENTS

| | | |
|---|---|---|
| 3,750,805 | 8/1973 | Finney . |
| 3,938,829 | 2/1976 | Anderson ........................ 280/414.1 |
| 3,963,263 | 6/1976 | Whitlock ......................... 280/414.1 |
| 3,989,267 | 11/1976 | Robinson . |
| 4,114,920 | 9/1978 | Boettcher . |
| 4,407,616 | 10/1983 | Hinze ................................... 410/3 |
| 4,463,965 | 8/1984 | Lawson .......................... 280/414.1 |
| 4,641,851 | 2/1987 | Knies . |
| 4,826,200 | 5/1989 | Tingley ........................... 414/536 X |
| 5,000,471 | 3/1991 | Sumrall . |
| 5,120,079 | 6/1992 | Boggs . |
| 5,193,835 | 3/1993 | Sheets . |
| 5,542,815 | 8/1996 | Roeling ............................... 410/3 X |
| 5,599,035 | 2/1997 | Spence ............................. 410/77 X |
| 5,683,214 | 11/1997 | Jeffreys ............................... 410/77 |

FOREIGN PATENT DOCUMENTS 52-55114  5/1977  Japan .............................. 292/341.17

*Primary Examiner*—Stephen T. Gordon

[57] ABSTRACT

This invention is an automatic boat to trailer latch permitting a one-person operation by a person either in the boat or in the water behind it, in light or in darkness, which allows that person to align the boat's bow with the latching mechanism, without sacrificing control of the boat.

5 Claims, 4 Drawing Sheets

AUTOMATIC BOAT TO TRAILER LATCH

CROSS-REFERENCE TO RELATED APPLICATION

Design change from original U.S. Pat. No. 5,599,035, issued Feb. 4, 1997. (additional version no. 1).

STATEMENT REGARDING FEDERALLY SPONSORED RESEARCH OR DEVELOPMENT.

Not Applicable

REFERENCE TO A MICROFICHE APPENDIX.

Not Applicable

BACKGROUND OF THE INVENTION

This invention relates to boat trailers, and more specifically to an automatic latching mechanism for attaching and holding a trailered boat to the receiving trailer.

One of the frequent difficulties encountered in trailering a boat is the necessity of assistance in aligning the boat to the trailer, and once so aligned, in affixing it to the trailer so that it may be removed from the water with the trailer.

Trailered boats, in general, are launched and recovered by utilizing a towing vehicle and submerging the trailer in water to a point where the boat may, in launching, be freely floated from the trailer when the latching device holding the boat to the trailer is released, and, conversely, upon recovery, the boat may be floated onto the trailer, held in place by an appropriate latching device, and so secured, removed with the trailer from the water by the towing vehicle.

While apparently simple in concept, the recovery process becomes significantly more difficult when wind and water conditions are less then ideal. Recovery of a boat utilizing a trailer on a calm water surface, with no wind, in daylight and with assistance of others, may be accomplished quite easily with most available boat to trailer latching mechanisms, automatic or not.

Choppy water surfaces, cross-winds and night recovery situations, however, make recovery of a trailered boat a much more tenuous task, particularly when assistance is not readily available.

Various devices are available which ostensibly permit one person boat recovery operations, by providing some type of self-activating locking mechanism. However, for the most part, they presume conditions where, if assistance is not available, conditions will readily permit one person to align the boat, move it over the trailer and, in so doing, activate the locking mechanism. Available devices do not facilitate one-person recovery operations in less than ideal conditions.

Specifically, an optimal automatic boat to trailer latch must permit one-person operation, where water surface disturbance causes pitching which prevents point to point vertical alignment of the boat being recovered and the trailer for any significant period of time.

An optimal automatic boat to trailer latch must permit one person operation under cross wind conditions which prevent longitudinal alignment of the boat being recovered and the trailer during the boat's approach over the trailer.

An optimal automatic boat to trailer latch must permit one-person operation by a person either in the boat or in the water behind it in light or in darkness, by allowing that person to align the boat's bow with the latching mechanism and to observe when the latching operation is complete, without sacrificing control of the boat.

In many instances, sportsmen, recreational boaters, or commercial operators of small trailered boats must recover their craft without assistance. Recovery is often after dark or before dawn. Further, recovery, unlike launch, cannot wait for ideal water and weather conditions.

As noted, existing self-activating locking mechanism for affixing boats to trailers to not satisfy the above requirements.

BRIEF SUMMARY OF THE INVENTION

This invention is directed to the provision of an automatic boat to trailer latch which will permit one-person recovery operations not dependent upon ideal conditions.

More specifically, this invention is directed to the provision of an automatic boat-to-trailer latch that is especially designed to allow the automatic latch mechanism to operate in water-surface conditions where point to point vertical alignment of the boat being recovered and the recovery trailer is difficult or impossible to maintain for any significant period of time.

A more specific object is to provide an automatic boat to trailer latch which permits recovery operations in cross wind conditions, by providing a guidance mechanism which permits the latch to operate without requiring precise longitudinal alignment of the boat being recovered and the trailer during all stages of recovery, including the boat's approach to and over the trailer.

The latch assembly of the present invention is of the type including a latch bar adapted to be secured to the prow of the boat. According to an important feature of the invention, this includes an elongated generally vertically extending latch bar portion spaced forwardly of the prow. This configuration allows operation in choppy surfaces when the prow positions in which the latching/recovery operation may be completed. Such a configuration additionally facilitates utilization in cross wind situations, by providing an extended, elongated contact surface for guiding the latch bar into latching position. The forwardly spacing of the latch bar from the prow also provides a greater margin for error in aligning the boat for the recovery operation.

According to a further feature of the invention, the latch assembly includes a latch structure adapted to be mounted on the forward end of the boat trailer, which further includes a base plate having three 90 degree angle plate fastened to it horizontally. Two of them will hold the latch lever in position, the other will mount in front of the latching lever creating a pocket.

According to a further feature of the invention, a lock pin protruding through upper and lower angle plates locking the latch lever in the receiving position.

According to a further feature of the invention, the latch structure further includes a latching lever and means of swiveling forward. This arrangement allows the elongated bar on the prow of the boat to push past the latching lever resulting in the spring snapping the lever back into position, securing the male latch bar member in the female latch structure, thus locking the boat to the trailer.

According to a further feature of the invention, the latch structure further includes funnel means extending rearwardly from said base plate and operative to direct the latch bar portion into center of latch structure. The funnel means may comprise guide bars extending rearwardly from the entrance of said angel plates and diverging rearwardly so as to provide a wide mouth target for the male latch bar portion. This arrangement ensures proper vertical alignment of the boat relative to the trailer upon latching because of the required vertical alignment of the latch bar and latch structure. Essentially, the latch bar functions as male member and the latch structure as female member of the entire latch assembly. This arrangement facilitates recovery operations in cross winds or other situations where longitudinal alignment of the boat or trailer is difficult or impossible to maintain during the entire approach and recovery process. The funnel means contacts the male vertically extending latch member and guides the latch member to the center of the female structure.

According to a further feature of the invention, to release boat from trailer, the lock pin is removed from its locking position allowing the elongated latch bar to pull the latch lever rearward releasing the boat from boat trailer.

DETAILED DESCRIPTION OF THE INVENTION

Figure 1:
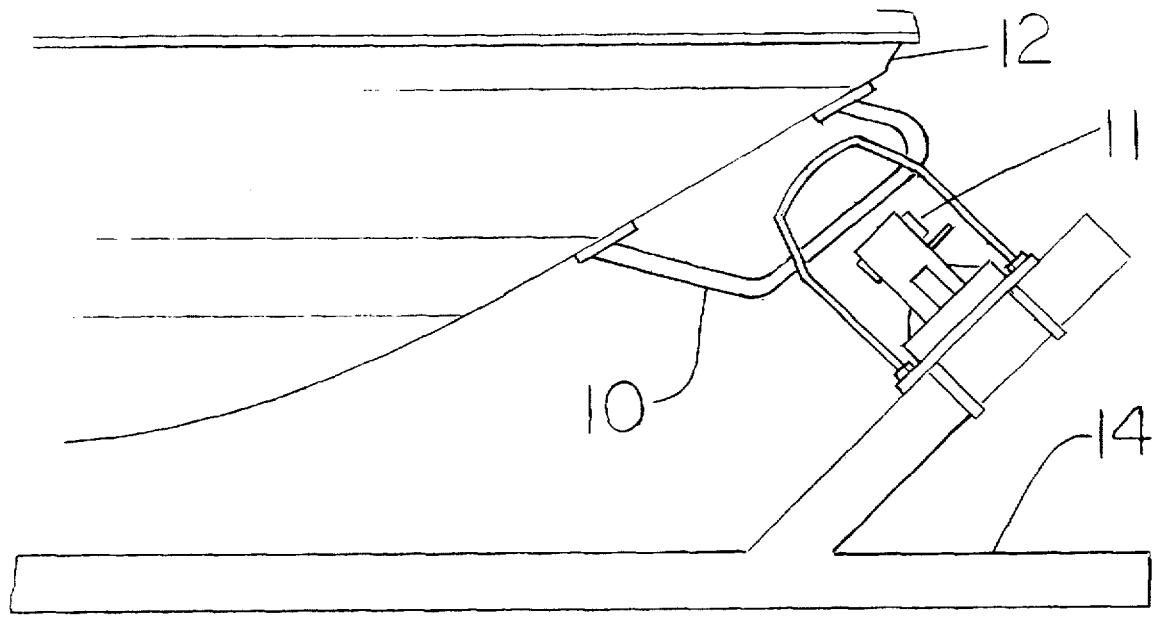
FIG. 1 is view of boat and latch on trailer.
Figure 2:
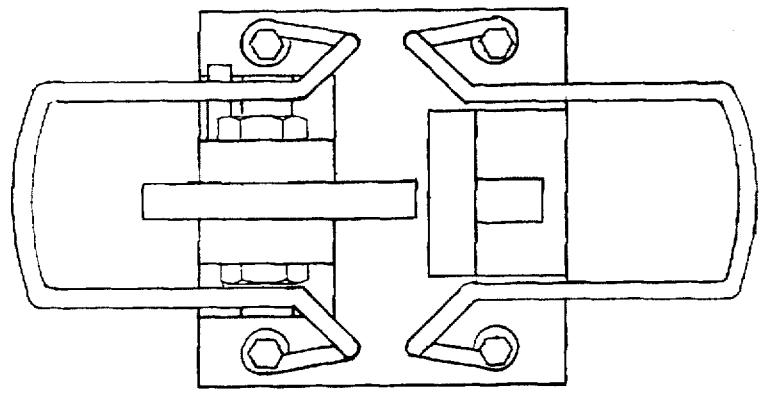
FIG. 2 is the receiving end view as it is mounted on trailer.
Figure 3:
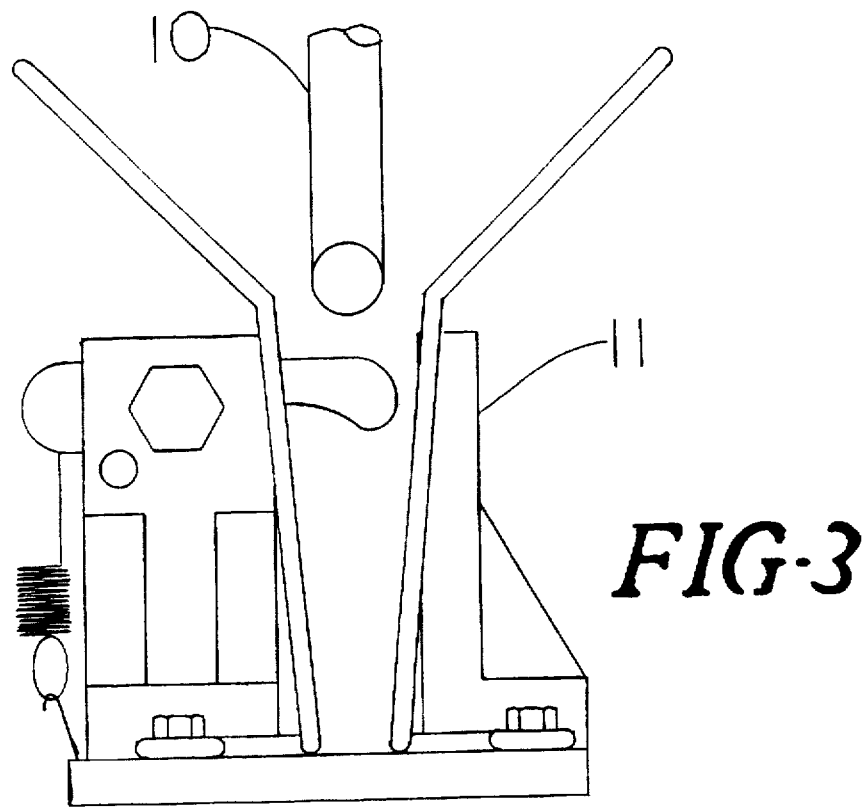
FIG. 3 is the side view as elongated bar on bow of boat approaches latch.
Figure 4:
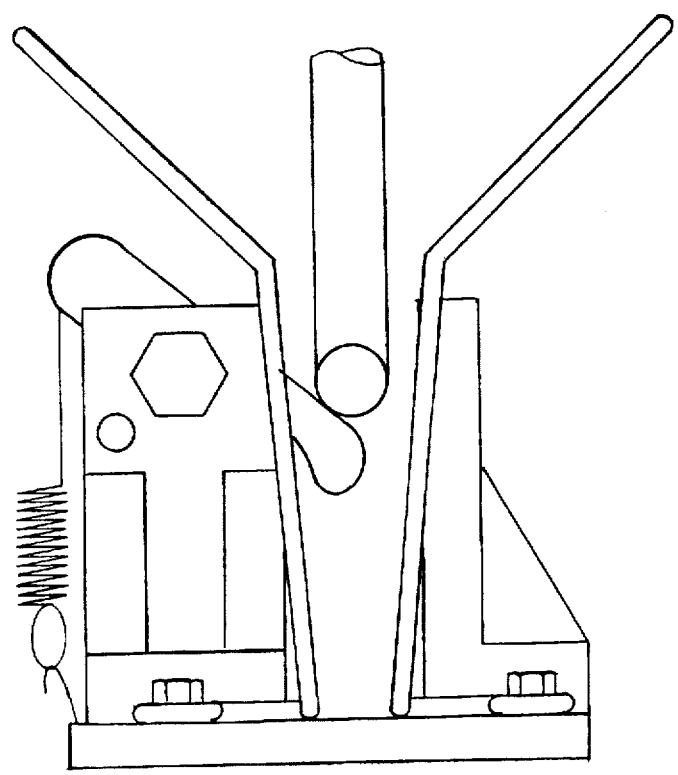
FIG. 4 is same as FIG. 3 with elongated bar pushing through latch lever.
Figure 5:
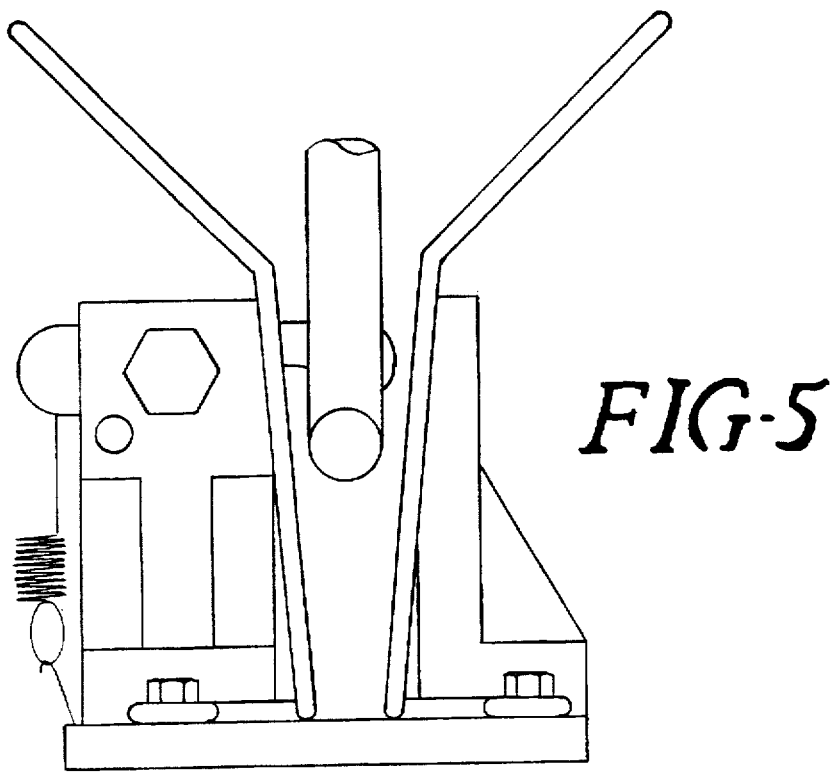
FIG. 5 is view of elongated bar engaged in latch structure.
Figure 6:
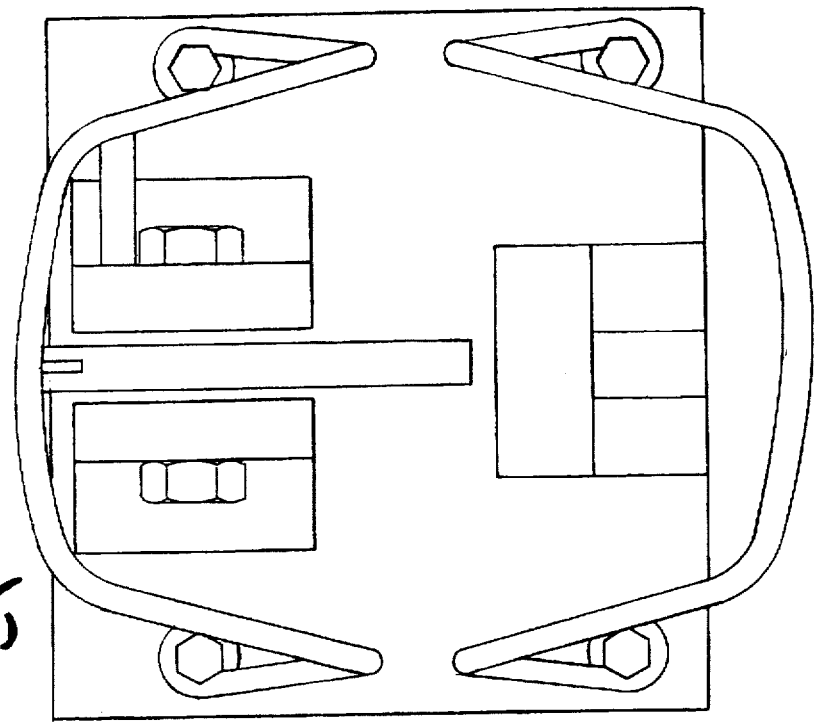
FIG. 6 is top view of latch assembly.
Figure 7:
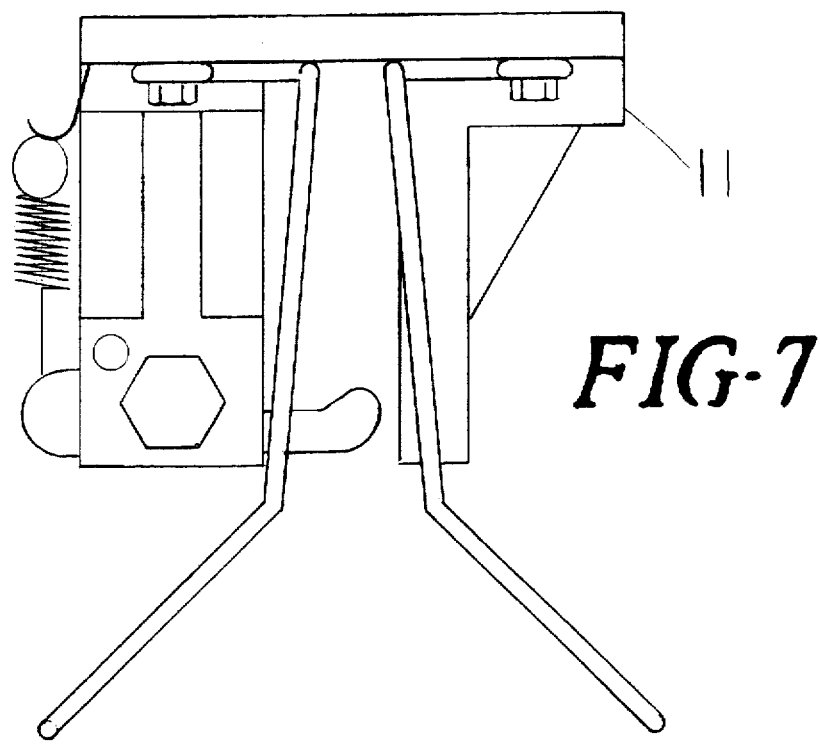
FIG. 7 is side view of structure.
Figure 8:
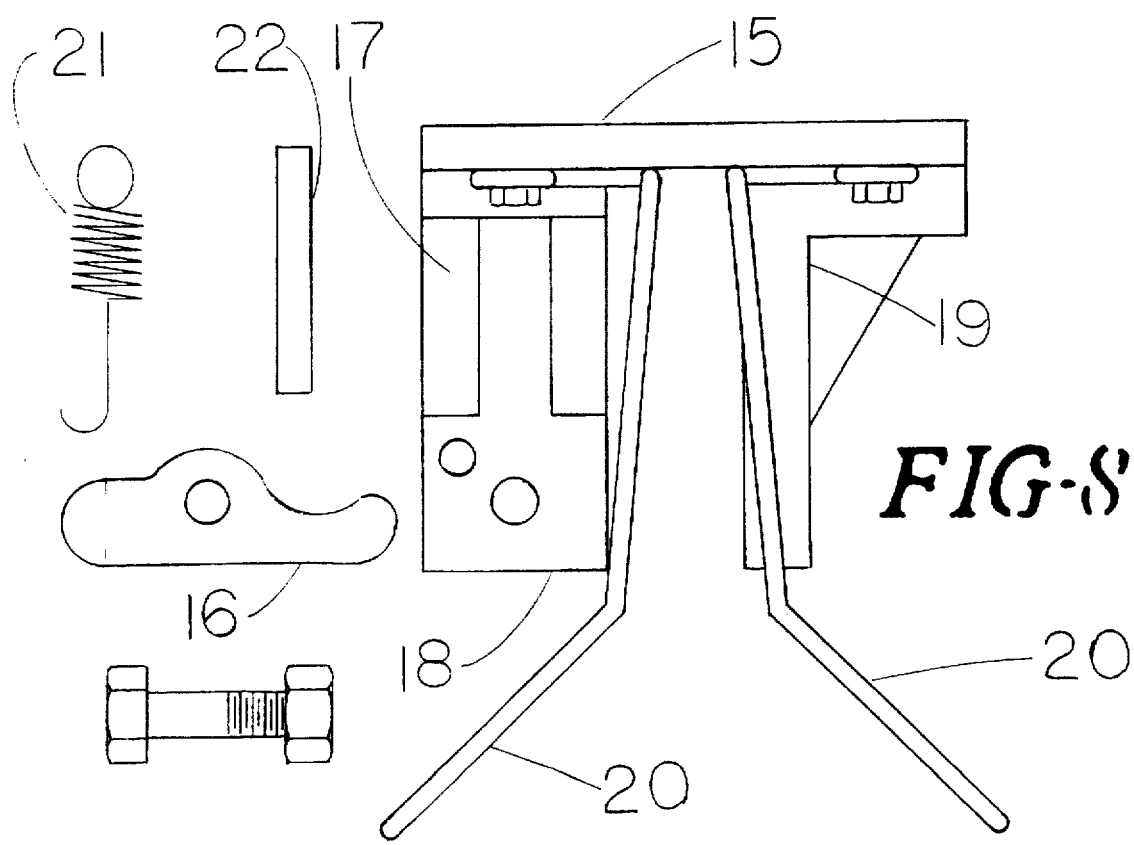
FIG. 8 is breakdown of components.

The invention latch assembly, broadly considered, includes a latch bar 10 and a latch structure 11.

Latch bar 10 is adapted to be secured to the prow of the boat 12. It is spaced forwardly from the prow of the boat and is elongated and generally vertically extending.

Latch structure 11 is adapted to be mounted on the forward end of the boat trailer 14. Latch structure 11 includes a base plate 15 and angle plates 17-18 and angle plate 19, latch lever 16, locking pin 22, two guide bars 20, spring 21.

The angle plates 17 and 18 are mounted to the base plate 15 with latching lever 16 mounted between them. Angle plate 19 is mounted in front of latch lever 16. Spring 21 is mounted on the back end of latch lever 16 and the face of base plate 15. The locking pin is fastened to structure by a chain. The pin slides in the hole protruding through angle plates 17 and 18, locking latch lever in the receiving position. Guide bars 20 mount in face of base plate 15, creating the funnel means for the elongated latch bar.

It will be seen that a funnel means to guide the latch bar 10 between angle plates 17, 18 and 19 has been provided by two guide bars 20. Said guide bars extend rearwardly and diverge outwardly from base plate 15. In doing so, they provide a wide mouth target for the latch bar 10 and serve to guide or direct said latch bar into the center of latching structure. The guide bars 20 are affixed to the housing 15 by fasteners.

According to a further feature of the invention, the funnel means provided by the guide bars 20 serves to act as a guide for directing the latch bar 10 into the receiving structure 11. In addition, it serves to help align the boat vertically by contacting the latch bar along its vertical extension.

The automatic latching feature of the invention is activated when the latch bar 10 pushes past latching lever 16, allowing spring 21 to pull latching lever 16 back against locking pin 22, thus securing boat to trailer.

WHEREAS a preferred embodiment of the invention has been illustrated and described in detail, it will be apparent that various changes may be made in the disclosed embodiment, without departing from the spirit of the invention.

I claim the following as my invention:

1. A latch assembly for latching a boat to a boat trailer, the latch assembly comprising:

a latch bar adapted to be secured to the prow of the boat and including an elongated generally vertically extending latch bar portion spaced forwardly from the prow; and a latch structure adapted to be mounted on the forward end of the boat trailer and including a base plate having three 90 degree angle plates fastened to it in a horizontal position and spaced to receive the latch bar portion therein: a first said angle plate facing generally upward, a second said angle plate facing generally downward and located beneath said first angle plate, and the third angle plate facing generally sideways and being horizontally spaced from the other two said angle plates to allow receipt of the latch bar portion;

a latching lever and means pivotally mounting the lever between the first and second of said angle plates;

a lock pin and means mounting the lock pin to said first angle plate on an upper vertical side thereof;

a spring mounted on the base plate and the back end of the latching lever to normally bias the latching member to a closed position when the lock pin is captured within the lock pin mounting means.

2. A latch assembly according to claim 1 wherein:

the latch structure further includes funnel means extending rearwardly from said base plate and operative to direct said latch bar portion into the center of the latch structure.

3. A latch assembly according to claim 2 wherein:

the funnel means comprises two guide bars extending rearwardly from an entrance to said base plate and diverging rearwardly so as to provide a wide mouth target for the latch bar portion.

4. A latch assembly according to claim 1 wherein: the latch assembly is configured such that when releasing a boat from the trailer, the lockpin is removed from the lock pin mounting means and thereby, releasing the latch lever, allowing the latch bar to move rearward, and freeing it from the latch assembly.

5. A latch assembly according to claim 1 wherein:

the lock pin protrudes through the first and second angle plates, forward of the latching lever, holding the latch lever in a receiving position.

* * * * *